(12) United States Patent
Echigo et al.

(10) Patent No.: US 11,749,824 B2
(45) Date of Patent: Sep. 5, 2023

(54) METAL PLATE, ELECTROCHEMICAL ELEMENT, ELECTROCHEMICAL MODULE, ELECTROCHEMICAL DEVICE, ENERGY SYSTEM, SOLID OXIDE FUEL CELL, AND METHOD FOR MANUFACTURING METAL PLATE

(71) Applicant: Osaka Gas Co., Ltd., Osaka (JP)

(72) Inventors: Mitsuaki Echigo, Osaka (JP); Hisao Ohnishi, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 193 days.

(21) Appl. No.: 17/043,841

(22) PCT Filed: Mar. 29, 2019

(86) PCT No.: PCT/JP2019/014383
§ 371 (c)(1),
(2) Date: Feb. 4, 2021

(87) PCT Pub. No.: WO2019/189918
PCT Pub. Date: Oct. 3, 2019

(65) Prior Publication Data
US 2021/0408568 A1     Dec. 30, 2021

(30) Foreign Application Priority Data
Mar. 30, 2018   (JP) .................. 2018-070347

(51) Int. Cl.
*H01M 8/1226* (2016.01)
*C22C 38/18* (2006.01)
*H01M 8/0232* (2016.01)
*H01M 8/026* (2016.01)
*H01M 8/04014* (2016.01)
(Continued)

(52) U.S. Cl.
CPC ........... *H01M 8/1226* (2013.01); *C22C 38/18* (2013.01); *H01M 8/026* (2013.01); *H01M 8/0232* (2013.01); *H01M 8/04022* (2013.01); *H01M 8/0618* (2013.01); *H01M 2008/1293* (2013.01)

(58) Field of Classification Search
None
See application file for complete search history.

(56) References Cited

U.S. PATENT DOCUMENTS

2003/0207166 A1* 11/2003 Hara ................ H01M 8/1213
429/466
2008/0107948 A1   5/2008 Yamanis
(Continued)

FOREIGN PATENT DOCUMENTS

CA   2998834 A1   3/2017
JP   2003323901 A  11/2003
(Continued)

*Primary Examiner* — Alix E Eggerding
(74) *Attorney, Agent, or Firm* — THE WEBB LAW FIRM

(57) ABSTRACT

Provided are a metal plate configured such that sufficient strength and performance are ensured and the workability and cost of mass production are improved, and an electrochemical element and the like including the metal plate. A metal plate 1 includes a thick portion 110, and a thin portion 120 that is thinner than the thick portion 110. The thin portion 120 is provided with a penetration space 1c passing through the thin portion 120 in the thickness direction.

16 Claims, 6 Drawing Sheets

(51) Int. Cl.
*H01M 8/0612* (2016.01)
*H01M 8/12* (2016.01)

(56) References Cited

U.S. PATENT DOCUMENTS

| | | | | |
|---|---|---|---|---|
| 2010/0086822 | A1* | 4/2010 | Omersa | H01M 8/2428 |
| | | | | 429/524 |
| 2015/0086887 | A1* | 3/2015 | Matsuo | H01M 8/0252 |
| | | | | 429/423 |
| 2017/0125833 | A1 | 5/2017 | Hwang et al. | |

FOREIGN PATENT DOCUMENTS

| | | |
|---|---|---|
| JP | 2006123308 A | 5/2006 |
| JP | 2008525967 A | 7/2008 |
| JP | 201521179 A | 2/2015 |
| JP | 2017174516 A | 9/2017 |

* cited by examiner

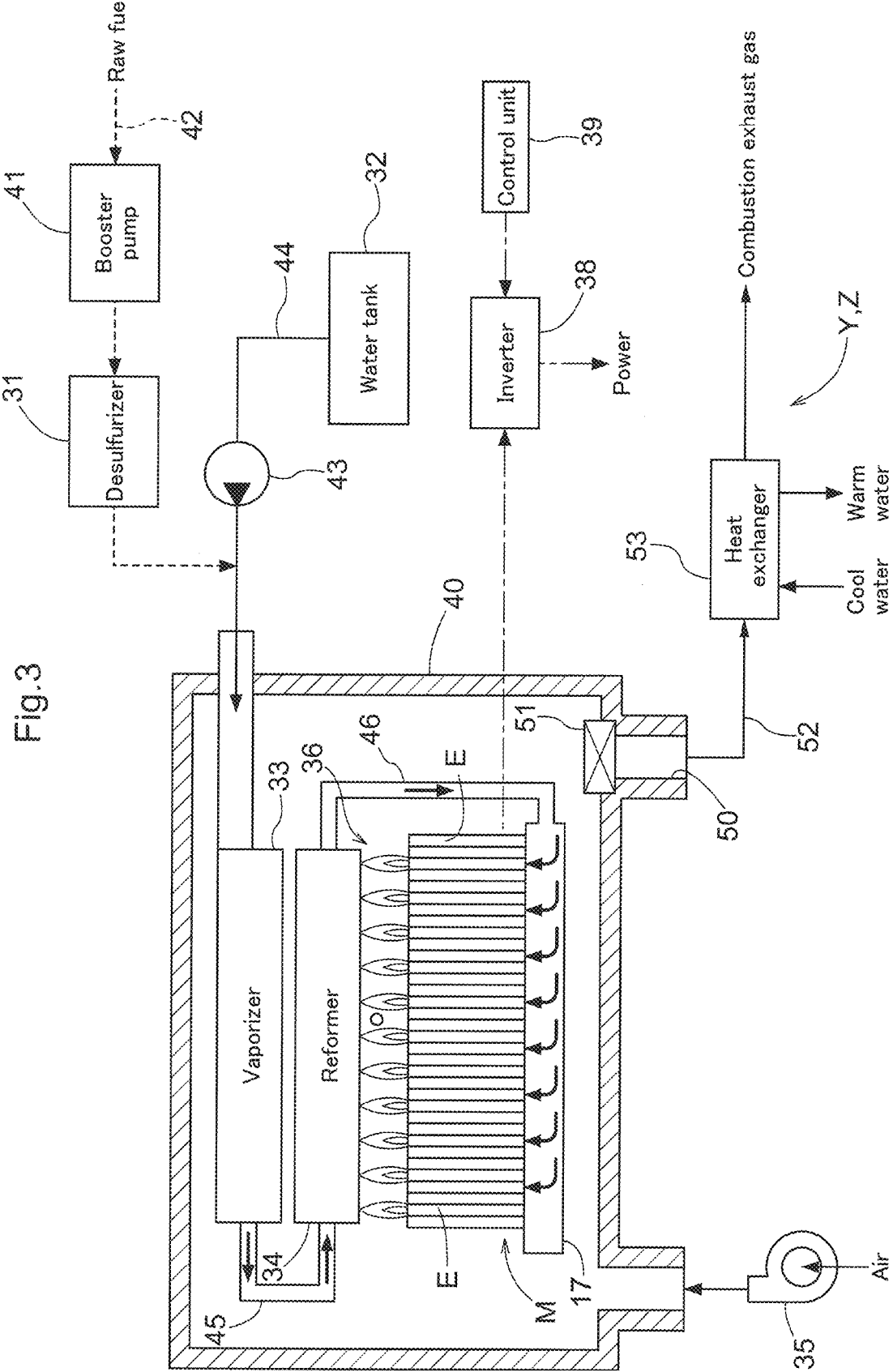

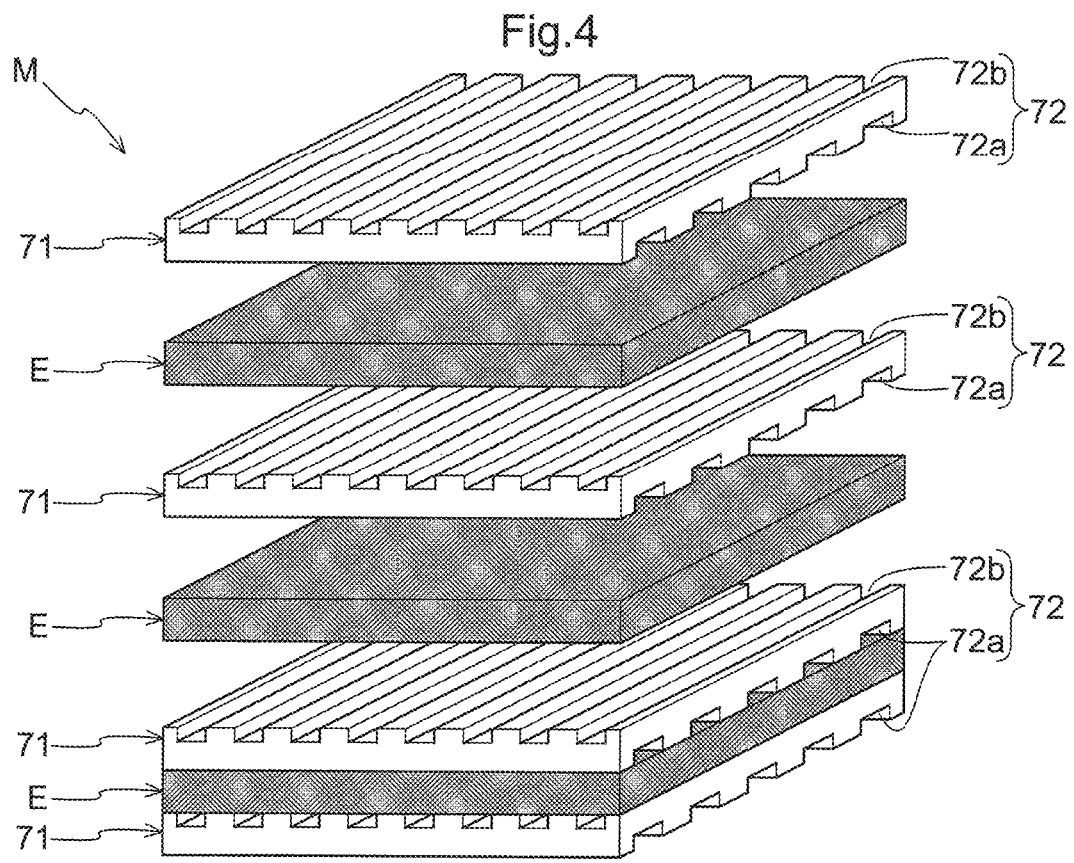
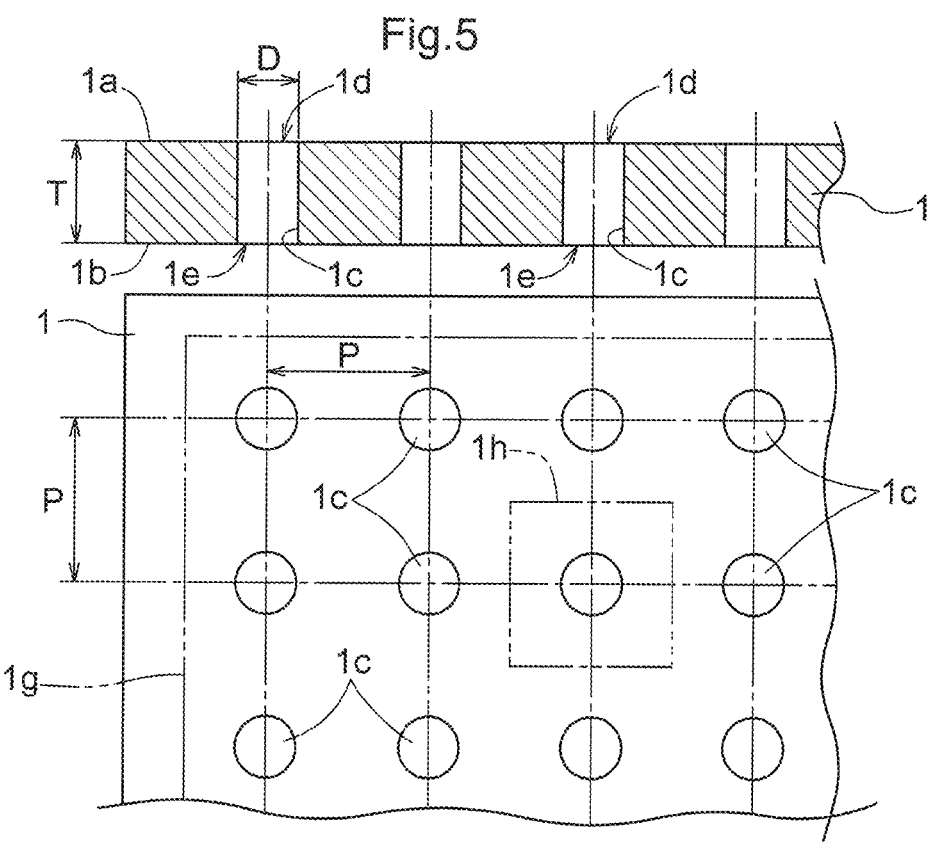

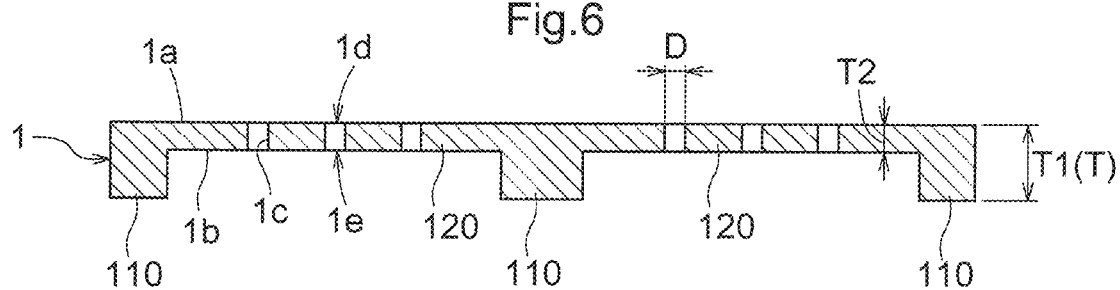
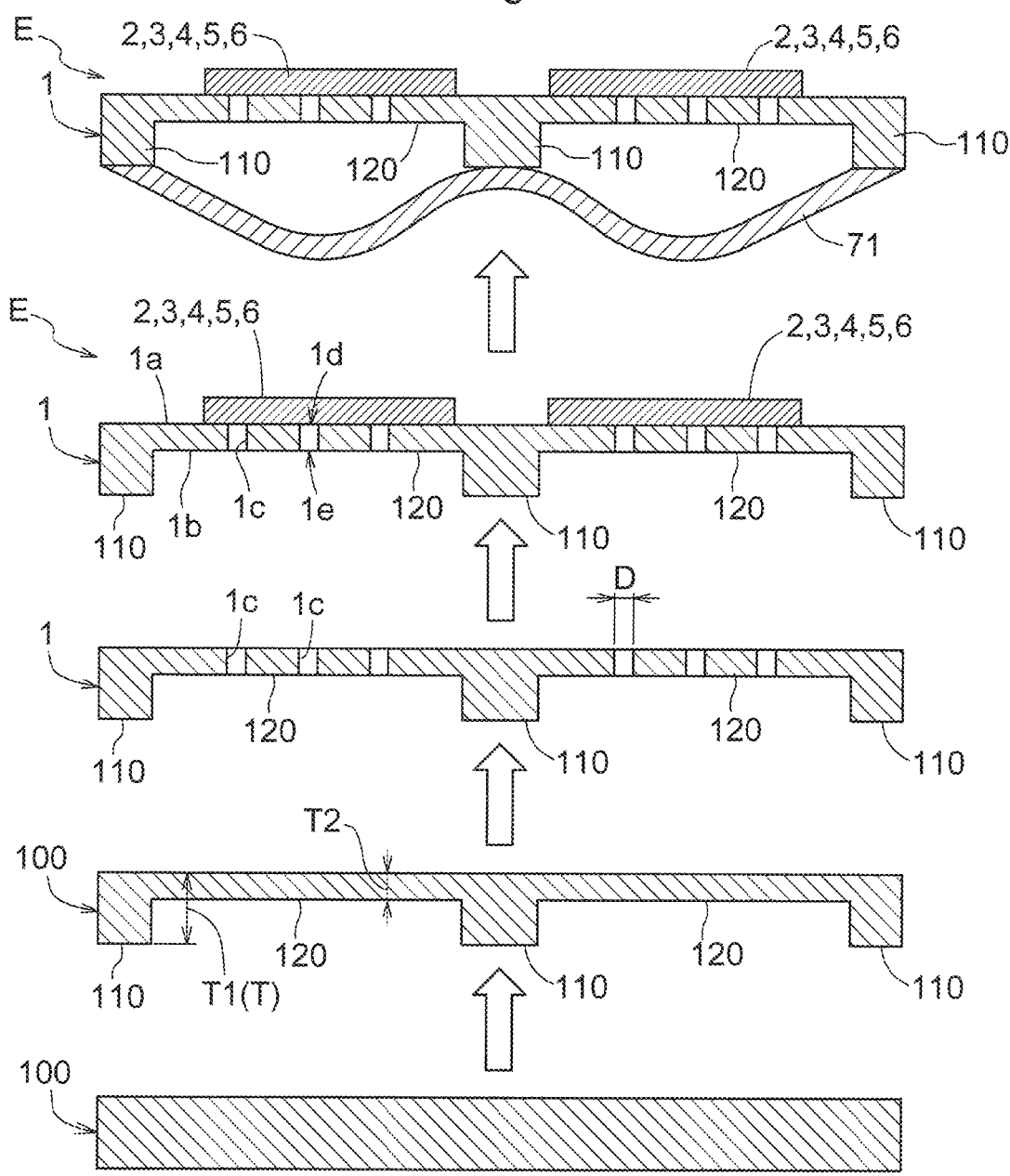

METAL PLATE, ELECTROCHEMICAL ELEMENT, ELECTROCHEMICAL MODULE, ELECTROCHEMICAL DEVICE, ENERGY SYSTEM, SOLID OXIDE FUEL CELL, AND METHOD FOR MANUFACTURING METAL PLATE

CROSS-REFERENCE TO RELATED APPLICATIONS

This application is the United States national phase of International Application No. PCT/JP2019/014383 filed Mar. 29, 2019, and claims priority to Japanese Patent Application No. 2018-070347 filed Mar. 30, 2018, the disclosures of which are hereby incorporated by reference in their entirety.

BACKGROUND OF THE INVENTION

Field of the Invention

The present invention relates to a metal plate, a metal-supported electrochemical element and the like including the metal plate, and a method for manufacturing the metal plate.

Description of Related Art

A metal support for a conventional metal-supported SOFC is formed by providing many holes in a metal plate. However, an optimum hole shape that is determined in view of workability and cost of mass production and ensures sufficient SOFC performance has not been found yet.

Patent Document 1: JP 2008-525967A

SUMMARY OF THE INVENTION

Patent Document 1 discloses a structure of a metal support configured in view of workability during the formation of a cell. The cell disclosed in Patent Document 1 is formed by providing an electrode layer, an electrolyte layer, and a counter electrode layer one on top of another on a metal foil that has a thickness of approximately 15 µm and is provided with many holes. Due to low strength, such a thin metal foil is difficult to handle during the cell production and is not suitable for mass production.

The present invention was made in view of the aforementioned problem, and an object thereof is to provide a metal plate configured such that sufficient strength and performance are ensured and the workability and cost of mass production are improved, and an electrochemical element and the like including the metal plate.

Configuration 1:
In order to achieve the above-mentioned object, in a characteristic configuration of a metal plate, the metal plate includes a thick portion, and a thin portion that is thinner than the thick portion, wherein the thin portion is provided with a penetration space passing through the thin portion in a thickness direction.

With the characteristic configuration described above, the thin portion that is thinner than the thick portion is provided with the penetration space. Therefore, the penetration space can be easily processed, thus making it possible to form a small penetration space at low cost while ensuring the strength of the metal plate due to the thick portion. This characteristic configuration is thus favorable.

Configuration 2:
The metal plate including a plurality of the thick portions and a plurality of the thin portions can be favorably used in an electrochemical element such as a fuel cell because a fluid such as gas can easily flow through the metal plate.

Configuration 3:
The metal plate in which the thin portion is provided with a plurality of the penetration spaces can be favorably used in an electrochemical element such as a fuel cell because a fluid such as gas can easily flow through the metal plate.

Configuration 4:
With the metal plate configured such that a metal plate aspect ratio that is a value obtained by dividing an overall thickness of the metal plate by the minimum inner diameter of the penetration space is 2 or more, it is possible to increase the strength of the metal plate while ensuring the permeability to a fluid such as gas, and the like. In addition, such a metal plate is preferable because an electrochemical element or the like can be easily formed on the metal plate. It should be noted that the metal plate aspect ratio of the metal plate is more preferably 3 or more, and even more preferably 5 or more. The reason for this is that employing such a configuration makes it possible to further increase the strength of the metal plate while ensuring the permeability of the metal plate to a fluid such as gas, and the like, and makes it easier to form an electrochemical element or the like on the metal plate. Also, the metal plate aspect ratio of the metal plate is preferably 30 or less, more preferably 25 or less, and even more preferably 20 or less. The reason for this is that employing such a configuration makes it possible to further increase the permeability of the metal plate to a fluid such as gas, and the like while maintaining the strength.

Configuration 5:
The metal plate whose overall thickness is 0.1 mm or more and 1 mm or less is preferable because it is possible to reduce the weight and cost of the metal plate while ensuring the strength of the metal plate. It should be noted that the thickness of the metal plate is more preferably 0.15 mm or more, and even more preferably 0.2 mm or more. The reason for this is that employing such a configuration makes it possible to further facilitate handling in mass production while maintaining the strength of the metal plate. Also, the thickness of the metal plate is more preferably 0.75 mm or less, and even more preferably 0.5 mm or less. The reason for this is that employing such a configuration makes it possible to further reduce the cost of the metal plate while maintaining the strength of the metal support.

Configuration 6:
The metal plate constituted by a single plate made of metal is preferable because the material cost and processing cost can be suppressed.

Configuration 7:
In another characteristic configuration of the metal plate according to the present invention, the metal plate is made of a Fe—Cr based alloy.

With the characteristic configuration described above, the oxidation resistance and high-temperature strength of the metal plate can be improved. Moreover, this characteristic configuration is favorable because the thermal expansion coefficient of the metal plate can be set to be close to those of objects to be supported (the materials of the constitutional elements, such as an electrode layer and an electrolyte layer, of an electrochemical element and the like), which are formed on the metal plate, for example, thus making it possible to realize a configuration having excellent heat-cycle durability.

Configuration 8:

In another characteristic configuration of the metal plate according to the present invention, at least a portion of a surface of the metal plate is covered by a metal oxide film.

With the characteristic configuration described above, the metal oxide coating can suppress diffusion of the components such as Cr from the metal plate. For example, in the case of an electrochemical element obtained by forming an electrode layer and the like on the metal plate, a decrease in performance of the electrode layer and the like can be suppressed, and the performance and durability of the electrochemical element can be improved.

Configuration 9:

An electrochemical element in which at least an electrode layer, an electrolyte layer, and a counter electrode layer are provided on/over the above-described metal support is favorable because sufficient performance is ensured, and the workability and cost of mass production are improved. Furthermore, this electrochemical element is favorable because the constitutional elements of the electrochemical element such as an electrode layer and an electrolyte layer are formed on/over the metal plate having excellent strength, and therefore, the constitutional elements of the electrochemical element such as an electrode layer and an electrolyte layer can be formed as thin layers or thin films, thus making it possible to reduce the material cost of the electrochemical element.

Configuration 10:

In a characteristic configuration of an electrochemical module according to the present invention, a plurality of the above-described electrochemical elements are arranged in an assembled state.

With the characteristic configuration described above, the plurality of the above-described electrochemical elements are arranged in an assembled state, thus making it possible to obtain an electrochemical module that is compact, has high performance, and has excellent strength and reliability, while also suppressing the material cost and processing cost.

Configuration 11

A characteristic configuration of an electrochemical device according to the present invention includes at least the above-described electrochemical module and a reformer, and includes a fuel supply unit that supplies fuel gas containing a reducing component to the electrochemical module.

With the characteristic configuration described above, the electrochemical device includes the electrochemical module and the reformer and includes the fuel supply unit that supplies the fuel gas containing a reducing component to the electrochemical module. Therefore, it is possible to use an existing raw fuel supply infrastructure such as city gas to realize an electrochemical device including an electrochemical module that has excellent durability, reliability, and performance. Also, it is easier to construct a system that recycles unused fuel gas discharged from the electrochemical module, thus making it possible to realize a highly efficient electrochemical device.

Configuration 12:

A characteristic configuration of an electrochemical device according to the present invention includes at least the above-described electrochemical module and an inverter that extracts power from the electrochemical module.

The characteristic configuration described above is preferable because the inverter can be used to boost electrical output obtained from the electrochemical module that has excellent durability, reliability, and performance, and to convert a direct current into an alternating current, thus making it easy to use the electrical output obtained from the electrochemical module.

Configuration 13:

A characteristic configuration of an energy system according to the present invention includes the above-described electrochemical device, and waste heat utilization system that reuses heat discharged from the electrochemical device.

The characteristic configuration described above includes the electrochemical device and the waste heat utilization system that reuses heat discharged from the electrochemical device, thus making it possible to realize an energy system that has excellent durability, reliability, and performance as well as excellent energy efficiency. It should be noted that it is also possible to realize a hybrid system that has excellent energy efficiency through combination of a power generation system that generates power with use of combustion heat from unused fuel gas discharged from the electrochemical device.

Configuration 14:

A characteristic configuration of a solid oxide fuel cell according to the present invention includes the above-described electrochemical element, wherein a power generation reaction is caused in the electrochemical element.

With the characteristic configuration described above, the solid oxide fuel cell including the electrochemical element that has excellent durability, reliability, and performance can cause a power generation reaction, and thus a low-cost solid oxide fuel cell having high durability and high performance can be obtained. It should be noted that a solid oxide fuel cell that can be operated in a temperature range of 650° C. or higher during the rated operation is more preferable because a fuel cell system that uses hydrocarbon-based gas such as city gas as raw fuel can be constructed such that waste heat discharged from a fuel cell can be used in place of heat required to convert raw fuel to hydrogen, and the power generation efficiency of the fuel cell system can thus be improved. A solid oxide fuel cell that is operated in a temperature range of 900° C. or lower during the rated operation is more preferable because the effect of suppressing volatilization of Cr from a metal-supported electrochemical element can be improved, and a solid oxide fuel cell that is operated in a temperature range of 850° C. or lower during the rated operation is even more preferable because the effect of suppressing volatilization of Cr can be further improved.

Configuration 15:

In order to achieve the above-mentioned object, in a characteristic configuration of a method for manufacturing a metal plate, the method for manufacturing a metal plate includes a first processing step of forming a thick portion and a thin portion that is thinner than the thick portion in the metal plate, and a second processing step of providing the thin portion formed in the first processing step with a penetration space passing through the thin portion in a thickness direction.

With the characteristic configuration described above, the thin portion that is thinner than the thick portion is formed in the first processing step, and the thin portion is provided with the penetration space in the second processing step. Therefore, the penetration space can be easily processed. Thus, it is possible to form a small penetration space at low cost while ensuring the strength of the metal plate due to the thick portion. This characteristic configuration is thus favorable.

Configuration 16:

Pressing processing, etching processing, or laser processing may be performed in the first processing step. Pressing processing, etching processing, or laser processing may be performed in the second processing step. The reason for this is that such processing can be performed at relatively low cost.

BRIEF DESCRIPTION OF THE DRAWINGS

FIG. 3 is a schematic diagram showing configurations of an electrochemical device and an energy system.

FIG. 4 is a schematic diagram showing a configuration of an electrochemical module.

FIG. 5 shows a plan view and a cross-sectional view showing a structure of a metal support.

FIG. 6 is a cross-sectional view showing a structure of a metal support.

FIG. 7 is an explanatory diagram of a method for manufacturing a metal support.

DETAILED DESCRIPTION OF THE INVENTION

First Embodiment

Figure 1:
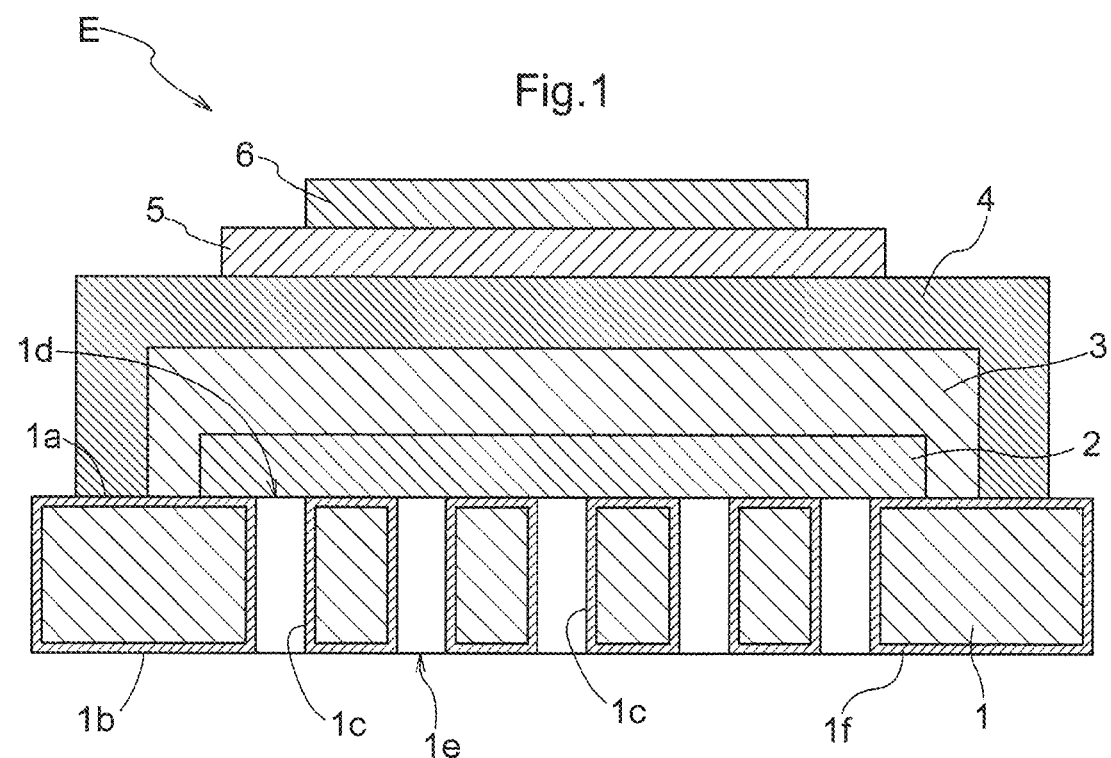
FIG. 1 is a schematic diagram showing a configuration of an electrochemical element.

Hereinafter, an electrochemical element E and a solid oxide fuel cell (SOFC) according to this embodiment will be described with reference to FIG. 1. The electrochemical element E is used as a constitutional element of a solid oxide fuel cell that receives a supply of air and fuel gas containing hydrogen and generates power, for example. It should be noted that, when the positional relationship between layers and the like are described in the description below, a counter electrode layer 6 side may be referred to as "upper portion" or "upper side", and an electrode layer 2 side may be referred to as "lower portion" or "lower side", with respect to an electrolyte layer 4, for example. In addition, regarding the surfaces of a metal support 1, a face on which the electrode layer 2 is formed is referred to as "front face 1a", and a face on a side opposite to the front face 1a is referred to as "back face 1b".

Electrochemical Element:

As shown in FIG. 1, the electrochemical element E includes a metal support 1 (an example of a metal plate), an electrode layer 2 formed on the metal support 1, an intermediate layer 3 formed on the electrode layer 2, and an electrolyte layer 4 formed on the intermediate layer 3. The electrochemical element E further includes a reaction preventing layer 5 formed on the electrolyte layer 4, and a counter electrode layer 6 formed on the reaction preventing layer 5. Specifically, the counter electrode layer 6 is formed above the electrolyte layer 4, and the reaction preventing layer 5 is formed between the electrolyte layer 4 and the counter electrode layer 6. The electrode layer 2 is porous, and the electrolyte layer 4 is dense.

Metal Support:

The metal support 1 supports the electrode layer 2, the intermediate layer 3, the electrolyte layer 4, and the like, and maintains the strength of the electrochemical element E. That is, the metal support 1 serves as a support that supports the electrochemical element E.

A material that has excellent electron conductivity, thermal resistance, oxidation resistance, and corrosion resistance is used as the material of the metal support 1. Examples thereof include ferrite-based stainless steel, austenite-based stainless steel, and a nickel-based alloy. In particular, an alloy containing chromium is favorably used. In this embodiment, the metal support 1 is made of a Fe—Cr based alloy that contains Cr in an amount of 18 mass % or more and 25 mass % or less, but a Fe—Cr based alloy that contains Mn in an amount of 0.05 mass % or more, a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, a Fe—Cr based alloy that contains Ti and Zr, a total content of Ti and Zr being 0.15 mass % or more and 1.0 mass % or less, and a Fe—Cr based alloy that contains Cu in an amount of 0.10 mass % or more and 1.0 mass % or less are particularly favorable.

The metal support 1 has a plate shape as a whole. The metal support 1 is provided with a plurality of penetration spaces 1c (holes) that pass through the metal support 1 from the front face 1a, which is a face on which the electrode layer 2 is provided, to the back face 1b. The penetration spaces 1c allow gas to permeate from the back face 1b of the metal support 1 to the front face 1a thereof. It should be noted that a configuration is also possible in which the plate-like metal support 1 is deformed into, for example, a box shape, a cylindrical shape, or the like through bending or the like and used.

A metal oxide layer 1f serving as a diffusion suppressing layer is provided on the surface of the metal support 1. That is, the diffusion suppressing layer is formed between the metal support 1 and the electrode layer 2, which will be described later. The metal oxide layer 1f is provided not only on the face of the metal support 1 exposed to the outside but also on the face (interface) that is in contact with the electrode layer 2. The metal oxide layer 1f can also be provided on the inner faces of the penetration spaces 1c. Element interdiffusion that occurs between the metal support 1 and the electrode layer 2 can be suppressed due to this metal oxide layer 1f. For example, when ferrite-based stainless steel containing chromium is used in the metal support 1, the metal oxide layer if is mainly made of a chromium oxide. The metal oxide layer if containing the chromium oxide as the main component suppresses diffusion of chromium atoms and the like of the metal support 1 to the electrode layer 2 and the electrolyte layer 4. The metal oxide layer if need only have such a thickness that allows both high diffusion preventing performance and low electric resistance to be achieved.

The metal oxide layer if can be formed using various techniques, but it is favorable to use a technique of oxidizing the surface of the metal support 1 to obtain a metal oxide. Also, the metal oxide layer if may be formed on the surface of the metal support 1 by using a spray coating technique (a technique such as thermal spraying technique, an aerosol deposition technique, an aerosol gas deposition technique, a powder jet deposition technique, a particle jet deposition technique, or a cold spraying technique), a PVD technique such as a sputtering technique or PLD technique, or a CVD technique, or may be formed by plating and oxidation treatment. Furthermore, the metal oxide layer if may also contain a spinel phase that has high electrical conductivity, or the like.

When a ferrite-based stainless steel material is used to form the metal support 1, its thermal expansion coefficient is close to that of YSZ (yttria-stabilized zirconia), GDC (gadolinium-doped ceria; also called CGO), or the like, which is used as the material of the electrode layer 2 and the electrolyte layer 4. Accordingly, even if low and high temperature cycling is repeated, the electrochemical element E is not likely to be damaged. Therefore, this is preferable due to being able to realize an electrochemical element E that has excellent long-term durability.

Structures of Metal Support and Penetration Spaces:

The metal support 1 can also be constituted by a single metal plate. The metal support 1 can also be formed by stacking a plurality of thin metal plates. The metal support 1 can also be formed by stacking a plurality of thin metal plates that have the same thickness or substantially the same thickness. The metal support 1 can also be formed by stacking a plurality of thin metal plates that have different thicknesses. The metal support 1 can also be formed by stacking a metal plate and a metal mesh plate. As shown in FIG. 6, a configuration is also possible in which the metal support 1 includes thick portions 110 and thin portions 120, and the thin portions 120 are provided with penetration spaces 1c. Hereinafter, examples of the structures of the metal support 1 and the penetration spaces 1c will be described with reference to the drawings. It should be noted that the metal oxide layer if is not shown.

First Example

The structure of the metal support 1 will be described in detail with reference to FIG. 5. As shown in FIG. 5, the metal support 1 is a plate-like member having a thickness T. That is, the metal support 1 has a plate shape as a whole. The metal support 1 is provided with the plurality of penetration spaces 1c that pass through the metal support 1 from the front face 1a to the back face 1b. In the first example, the penetration spaces 1c are holes with a circular cross section. The cross section of each of the penetration spaces 1c may also have a rectangular shape, a triangular shape, a polygonal shape, or the like other than a circular shape or a substantially circular shape. Various shapes can be selected as long as the penetration spaces 1c can be formed and the functions of the metal support 1 can be maintained. These holes (penetration spaces 1c) are formed in the metal support 1 through laser processing, pressing processing, etching processing, or a combination thereof. The central axes of these holes are orthogonal to the metal support 1. It should be noted that the central axes of the holes (penetration spaces 1c) may be inclined to the metal support 1.

The openings formed in the front face 1a by the penetration spaces 1c are referred to as "front-side openings 1d". The openings formed in the back face 1b by the penetration spaces 1c are referred to as "back-side openings 1e". Since the penetration spaces 1c are holes having a circular cross section, all of the front-side openings 1d and the back-side openings 1e have a circular shape. The front-side openings 1d and the back-side openings 1e may have the same size. The back-side openings 1e may be larger than the front-side openings 1d. The diameter of each of the front-side openings 1d is taken as a "diameter D".

As shown in FIG. 5, in the metal support 1, the plurality of holes (penetration spaces 1c) are formed at positions corresponding to the lattice points of an orthogonal lattice at a pitch P (interval). The arrangement pattern of the plurality of holes (penetration spaces 1c) may be an orthorhombic lattice or an equilateral-triangular lattice other than the orthogonal lattice. The plurality of holes can be arranged at intersection points of the diagonal lines in addition to the lattice points. Various arrangement patterns can be selected as long as the penetration spaces can be formed and the functions of the metal support can be maintained.

A region of the front face 1a of the metal support 1 provided with the penetration spaces 1c is referred to as the "hole region 1g". The hole region 1g is provided in the entire metal support 1 excluding the vicinity of the outer periphery. The metal support 1 may be provided with a single hole region 1g or a plurality of hole regions 1g.

The metal support 1 is required to have a strength that is sufficient to serve as a support for forming the electrochemical element E. The thickness T of the metal support 1 is preferably 0.1 mm or more, more preferably 0.15 mm or more, and even more preferably 0.2 mm or more. The thickness T of the metal support 1 is preferably 1.0 mm or less, more preferably 0.75 mm or less, and even more preferably 0.5 mm or less.

The diameter D of each of the front-side openings 1d is preferably 3 μm or more, more preferably 5 μm or more, and even more preferably 10 μm or more. The diameter D of each of the front-side openings 1d is preferably 500 μm or less, more preferably 100 μm or less, and even more preferably 60 μm or less.

An arrangement pitch P of the penetration spaces 1c (holes) is preferably two or more times longer than, more preferably three or more times longer than, and even more preferably four or more times longer than, the diameter D of each of the front-side openings 1d.

An area S of each of the front-side openings 1d formed by the penetration spaces 1c is preferably $7.0 \times 10^{-6}$ mm$^2$ or more, more preferably $2.0 \times 10^{-5}$ mm$^2$ or more, and even more preferably $7.5 \times 10^{-5}$ mm$^2$ or more. Also, the area S is preferably 0.2 mm$^2$ or less, more preferably $8.0 \times 10^{-3}$ mm$^2$ or less, and even more preferably $3.0 \times 10^{-3}$ mm$^2$ or less.

A value obtained by dividing the thickness of a metal plate by the inner diameter of a through hole is defined as an aspect ratio. A value obtained by dividing the overall thickness of the metal support 1 by the minimum inner diameter of each of the penetration spaces 1c is defined as a metal plate aspect ratio. It is favorable to set the metal plate aspect ratio of the metal support 1 to 2 or more. The reason for this is that it is possible to increase the strength of the metal support 1 while ensuring the permeability to a fluid such as gas, and the like, and to easily form the electrochemical element E or the like on the metal support 1, for example. It should be noted that the metal plate aspect ratio of the metal support 1 is more preferably 3 or more, and even more preferably 5 or more. The reason for this is that employing such a configuration makes it possible to further increase the strength of the metal support 1 while ensuring the permeability of the metal support 1 to a fluid such as gas, and the like, and makes it easier to form the electrochemical element E or the like on the metal support 1. Also, the metal plate aspect ratio of the metal support 1 is preferably 30 or less, more preferably 25 or less, and even more preferably 20 or less. The reason for this is that employing such a configuration makes it possible to further increase the permeability of the metal support 1 to a fluid such as gas, and the like while maintaining the strength.

Second Example

In the description below, members and portions similar to those in the first example are denoted by the same reference numerals, and the descriptions thereof may be omitted.

As shown in FIG. 6, the metal support 1 according to this example includes three thick portions 110 and two thin portions 120. This metal support 1 is constituted by a single plate made of metal. A thickness T2 of each of the thin portions 120 is smaller than a thickness T1 of each of the thick portions 110. It should be noted that, in this example, the overall thickness T of the metal support 1 corresponds to the thickness T1 of each of the thick portions 110. The thin portions 120 are provided with a plurality of penetration spaces 1c.

A method for manufacturing the metal support 1 according to this example will be described with reference to FIG. 7. The method for manufacturing the metal support 1 includes a first processing step of forming the thin portions 120, and a second processing step of forming the penetration spaces 1c.

In the first processing step, the thick portions 110 and the thin portions 120 are formed in a metal plate 100. Pressing processing is performed in the first processing step of this example. For example, the metal plate 100 is sandwiched between molds and pressed, and is thus provided with the thick portions 110 and the thin portions 120.

In the second processing step, the thin portions 120 formed in the first processing step are provided with the penetration spaces 1c. Pressing (punching) processing is performed in the second processing step of this example. For example, the metal plate 100 is sandwiched between molds and pressed, and thus the thin portions 120 of the metal plate 100 are provided with the penetration spaces 1c. The metal support 1 is manufactured through the first processing step and second processing step described above.

As shown in FIG. 7, the electrochemical element E may be manufactured by forming the electrode layer 2, the intermediate layer 3, the electrolyte layer 4, the reaction preventing layer 5, the counter electrode layer 6, and the like, which will be described later, on the front face 1a of the manufactured metal support 1.

Furthermore, as shown in FIG. 7, a cell connecting member 71 may be joined to the thick portions 110 of the metal support 1. The cell connecting member 71 is a wavelike plate member made of metal. In an electrochemical module M formed by stacking the electrochemical elements E, the metal support 1 of one electrochemical element E and the counter electrode layer 6 of another electrochemical element E are connected to each other via the cell connecting member 71.

Third Example

Figure 8:
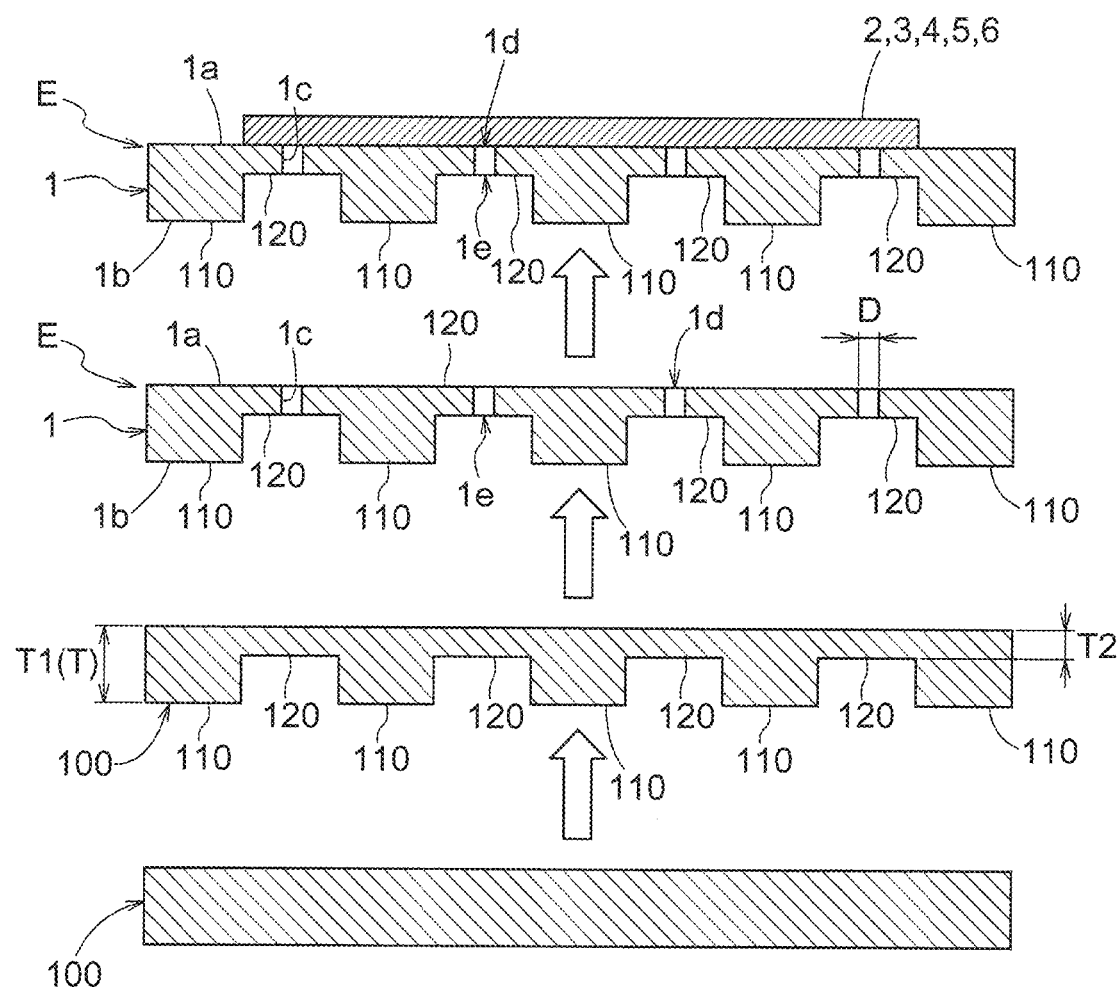
FIG. 8 is an explanatory diagram of a method for manufacturing a metal support.

As shown in FIG. 8, a configuration is also possible in which the metal support 1 includes five thick portions 110 and four thin portions 120. This metal support 1 is constituted by a single plate made of metal. The thin portions 120 are provided with a plurality of penetration spaces 1c.

In this third example, as in the second example, the thick portions 110 and the thin portions 120 are formed in a metal plate 100 through pressing processing in the first processing step. The thin portions 120 formed in the first processing step are provided with the penetration spaces 1c through pressing (punching) processing in the second processing step. The metal support 1 is thus manufactured.

It should be noted that, as shown in FIG. 8, the electrochemical element E may be manufactured by forming the electrode layer 2, the intermediate layer 3, the electrolyte layer 4, the reaction preventing layer 5, the counter electrode layer 6, and the like, which will be described later, on the front face 1a of the manufactured metal support 1.

Fourth Example

Figure 9:
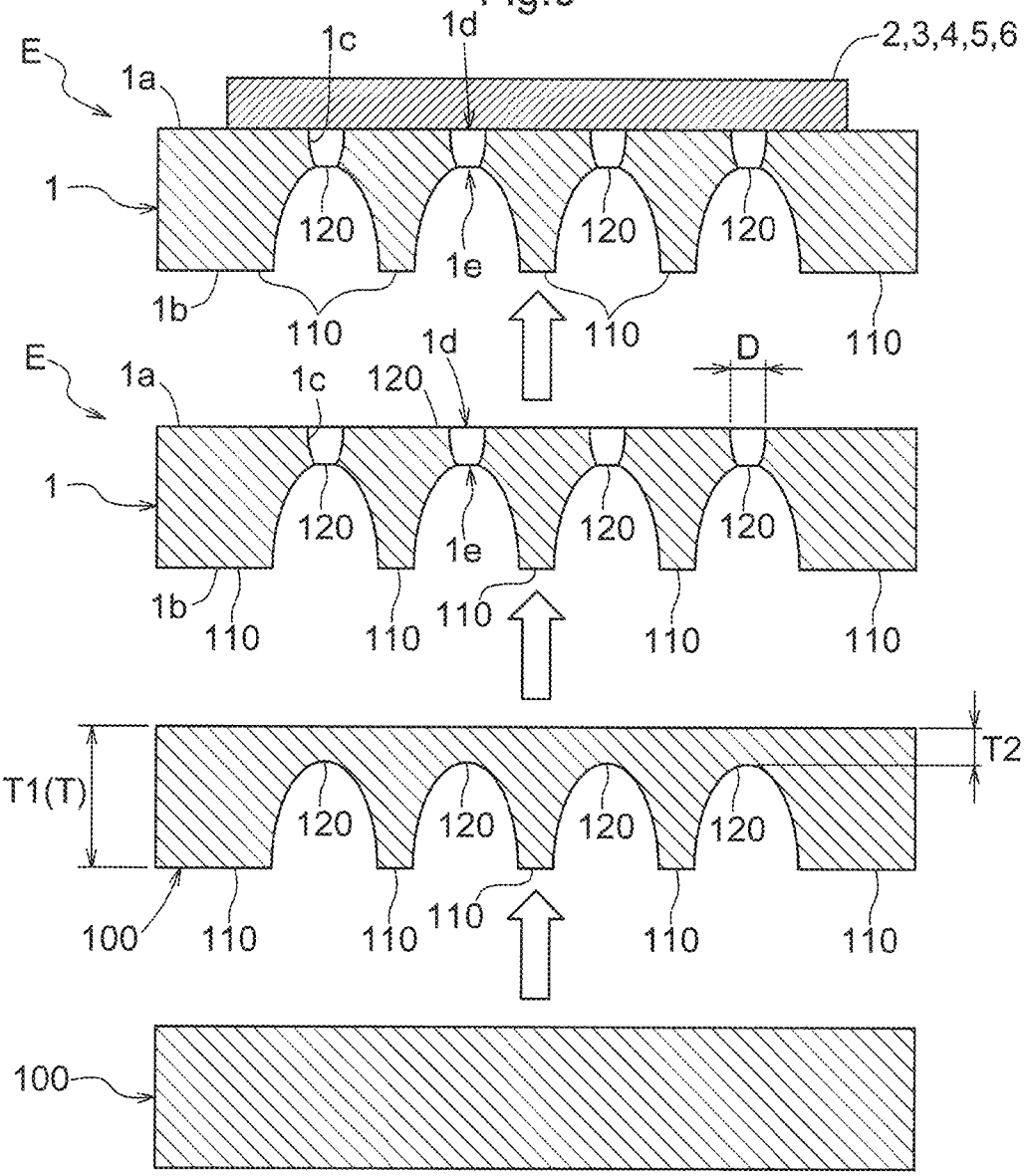
FIG. 9 is an explanatory diagram of a method for manufacturing a metal support.

The metal support 1 can also be manufactured through etching processing. FIG. 9 shows an example in which etching processing is performed in the first processing step and the second processing step.

In the first processing step, the thick portions 110 and the thin portions 120 are formed in a metal plate 100. Etching processing is performed in the first processing step of this example. For example, one face of the metal plate 100 is subjected to etching processing, and thus the thin portions 120 are formed. Portions that are not subjected to etching processing correspond to the thick portions 110.

In the second processing step, the thin portions 120 formed in the first processing step are provided with the penetration spaces 1c. Etching processing is performed in the second processing step of this example. For example, a face of the metal plate 100 on a side opposite to the face that has been subjected to the first processing step is subjected to etching processing, and thus the penetration spaces 1c are formed. The metal support 1 is manufactured through the first processing step and second processing step described above.

As shown in FIG. 9, the electrochemical element E may be manufactured by forming the electrode layer 2, the intermediate layer 3, the electrolyte layer 4, the reaction preventing layer 5, the counter electrode layer 6, and the like, which will be described later, on the front face 1a of the manufactured metal support 1.

Fifth Example

Figure 10:
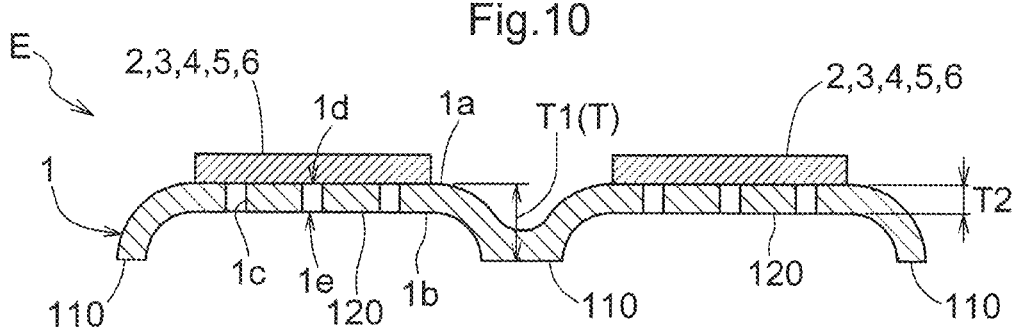
FIG. 10 is a cross-sectional view showing a structure of a metal support.

As shown in FIG. 10, the metal support 1 can also be formed in a shape with a curved cross section. The metal support 1 shown in FIG. 10 is curved at the two ends and the center, and has a gentle wave shape as a whole. The two ends and the center are curved and thus have a thickness T1 relative to a plane along which the metal support 1 extends, and has improved rigidity. The thickness T1 is larger than the thicknesses T2 of the flat portions provided with the penetration spaces 1c. That is, it can be said that, in the metal support 1 shown in FIG. 10, the thick portions 110 having a thickness T1 are formed at the two ends and the center, and the thin portions 120 having a thickness T2 are provided with the penetration spaces 1c. The metal support 1 having such a shape can be manufactured through pressing processing. Also, in this example, the electrochemical element E can be manufactured by forming the electrode layer 2, the intermediate layer 3, the electrolyte layer 4, the reaction preventing layer 5, the counter electrode layer 6, and the like, which will be described later, on the front face 1a of the metal support 1.

In the description above, the method for manufacturing the metal support 1 according to this embodiment is described. Pressing processing, etching processing, or laser processing can be performed in the first processing step. Pressing processing, etching processing, or laser processing can be performed in the second processing step. The processing method performed in the first processing step may be the same as or different from the processing method performed in the second processing step. For example, a configuration is also possible in which pressing processing is performed in the first processing step and laser processing is performed in the second processing step. For example, a configuration is also possible in which pressing processing is performed in the first processing step and etching processing is performed in the second processing step.

Electrode Layer:

As shown in FIG. 1, the electrode layer 2 can be provided as a thin layer in a region that is larger than the region provided with the penetration spaces 1c, on the front face of the metal support 1. When it is provided as a thin layer, the thickness can be set to approximately 1 μm to 100 μm, and preferably 5 μm to 50 μm, for example. This thickness makes it possible to ensure sufficient electrode performance while also achieving cost reduction by reducing the amount of expensive electrode layer material that is used. The region provided with the penetration spaces 1c is entirely covered by the electrode layer 2. That is, the penetration spaces 1c are formed inside the region of the metal support 1 in which the electrode layer 2 is formed. In other words, all the penetration spaces 1c are provided facing the electrode layer 2.

A composite material such as NiO-GDC, Ni-GDC, NiO—YSZ, Ni—YSZ, CuO—CeO$_2$, or Cu—CeO$_2$ can be used as the material for forming the electrode layer 2, for example. In these examples, GDC, YSZ, and CeO$_2$ can be called the aggregate of the composite material. It should be noted that it is preferable to form the electrode layer 2 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 2 is obtained without using calcining in a high temperature range of higher than 1100° C., for example. Therefore, this is preferable due to being able to prevent damage to the metal support 1, suppress element interdiffusion between the metal support 1 and the electrode layer 2, and realize an electrochemical element that has excellent durability. Furthermore, using low-temperature calcining makes it possible to facilitate handling of raw materials and is thus more preferable.

The inside and the surface of the electrode layer 2 are provided with a plurality of pores in order to impart gas permeability to the electrode layer 2.

That is, the electrode layer 2 is formed as a porous layer. The electrode layer 2 is formed to have a denseness of 30% or more and less than 80%, for example. Regarding the size of the pores, a size suitable for smooth progress of an electrochemical reaction can be selected as appropriate. It should be noted that the "denseness" is a ratio of the material of the layer to the space and can be represented by a formula "1−porosity", and is equivalent to relative density.

Intermediate Layer:

As shown in FIG. 1, the intermediate layer 3 (intervening layer) can be formed as a thin layer on the electrode layer 2 so as to cover the electrode layer 2. When it is formed as a thin layer, the thickness can be set to approximately 1 μm to 100 μm, preferably approximately 2 μm to 50 μm, and more preferably approximately 4 μm to 25 μm, for example. This thickness makes it possible to ensure sufficient performance while also achieving cost reduction by reducing the amount of expensive intermediate layer material that is used. YSZ (yttria-stabilized zirconia), SSZ (scandia-stabilized zirconia), GDC (gadolinium-doped ceria), YDC (yttrium-doped ceria), SDC (samarium-doped ceria), or the like can be used as the material of the intermediate layer 3. In particular, ceria-based ceramics are favorably used.

It is preferable to form the intermediate layer 3 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 3 is obtained without using calcining in a high temperature range of higher than 1100° C., for example. Therefore, it is possible to prevent damage to the metal support 1, suppress element interdiffusion between the metal support 1 and the electrode layer 2, and realize an electrochemical element E that has excellent durability. Furthermore, using low-temperature calcining makes it possible to facilitate handling of raw materials and is thus more preferable.

It is preferable that the intermediate layer 3 has oxygen ion (oxide ion) conductivity. It is more preferable that the intermediate layer 3 has both oxygen ion (oxide ion) conductivity and electron conductivity, namely mixed conductivity. The intermediate layer 3 that has these properties is suitable for application to the electrochemical element E.

Electrolyte Layer:

As shown in FIG. 1, the electrolyte layer 4 is formed as a thin layer on the intermediate layer 3 so as to cover the electrode layer 2 and the intermediate layer 3. The electrolyte layer 4 can also be formed as a thin film having a thickness of 10 μm or less. Specifically, as shown in FIG. 1, the electrolyte layer 4 is provided on both the intermediate layer 3 and the metal support 1 (spanning the intermediate layer 3 and the metal support 1). Configuring the electrolyte layer 4 in this manner and joining the electrolyte layer 4 to the metal support 1 make it possible to allow the electrochemical element to have excellent toughness as a whole.

Also, as shown in FIG. 1, the electrolyte layer 4 is provided in a region that is larger than the region provided with the penetration spaces 1c, on the front face of the metal support 1. That is, the penetration spaces 1c are formed inside the region of the metal support 1 in which the electrolyte layer 4 is formed.

The leakage of gas from the electrode layer 2 and the intermediate layer 3 can be suppressed in the vicinity of the electrolyte layer 4. A description of this will be given. When the electrochemical element E is used as a constitutional element of a SOFC, gas is supplied from the back side of the metal support 1 through the penetration spaces 1c to the electrode layer 2 during the operation of the SOFC. In a region where the electrolyte layer 4 is in contact with the metal support 1, leakage of gas can be suppressed without providing another member such as a gasket. It should be noted that, although the entire vicinity of the electrode layer 2 is covered by the electrolyte layer 4 in this embodiment, a configuration in which the electrolyte layer 4 is provided on the electrode layer 2 and the intermediate layer 3 and a gasket or the like is provided in its vicinity may also be adopted.

YSZ (yttria-stabilized zirconia), SSZ (scandia-stabilized zirconia), GDC (gadolinium-doped ceria), YDC (yttrium-doped ceria), SDC (samarium-doped ceria), LSGM (strontium- and magnesium-doped lanthanum gallate), and the like can be used as the material of the electrolyte layer 4. In particular, zirconia-based ceramics are favorably used. Using zirconia-based ceramics for the electrolyte layer 4 makes it possible to increase the operation temperature of the SOFC in which the electrochemical element E is used compared with the case where ceria-based ceramics are used. For example, when the electrochemical element E is used in the SOFC, by adopting a system configuration in which a material such as YSZ that can exhibit high electrolyte performance even in a high temperature range of approximately 650° C. or higher is used as the material of the electrolyte layer 4, a hydrocarbon-based raw fuel material such as city gas or LPG is used as the raw fuel for the system, and the raw fuel material is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 4 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an electrolyte layer 4 that is dense and has high gas-tightness and gas barrier properties is obtained without using calcining in a high temperature range of higher than 1100° C., for example. Therefore, it is possible to prevent damage to the metal support 1, suppress element interdiffusion between the metal support 1 and the electrode layer 2, and realize an electrochemical element E that has excellent performance and durability. In particular, using low-temperature calcining, a spray coating technique, or the like makes it possible to realize a low-cost element and is thus preferable. Furthermore, using a spray coating technique makes it easy to obtain, in a low temperature range, an electrolyte layer that is dense and has high gas-tightness and gas barrier properties, and is thus more preferable.

The electrolyte layer 4 is given a dense configuration in order to block gas leakage of anode gas and cathode gas and exhibit high ion conductivity. The electrolyte layer 4 preferably has a denseness of 90% or more, more preferably 95% or more, and even more preferably 98% or more. When the electrolyte layer 4 is formed as a uniform layer, the denseness is preferably 95% or more, and more preferably 98% or more. When the electrolyte layer 4 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer:

The reaction preventing layer 5 can be formed as a thin layer on the electrolyte layer 4. When it is formed as a thin layer, the thickness can be set to approximately 1 μm to 100 μm, preferably approximately 2 μm to 50 μm, and more preferably approximately 3 μm to 15 μm, for example. This thickness makes it possible to ensure sufficient performance while also achieving cost reduction by reducing the amount of expensive reaction preventing layer material that is used. The material of the reaction preventing layer 5 need only be capable of preventing reactions between the component of the electrolyte layer 4 and the component of the counter electrode layer 6. For example, a ceria-based material or the like is used. Materials that contain at least one element selected from the group consisting of Sm, Gd, and Y are favorably used as the material of the reaction preventing layer 5. It is preferable that at least one element selected from the group consisting of Sm, Gd, and Y is contained, and the total content of these elements is 1.0 mass % or more and 10 mass % or less. Introducing the reaction preventing layer 5 between the electrolyte layer 4 and the counter electrode layer 6 effectively suppresses reactions between the material constituting the counter electrode layer 6 and the material constituting the electrolyte layer 4 and makes it possible to improve long-term stability in the performance of the electrochemical element E. Forming the reaction preventing layer 5 using, as appropriate, a method through which the reaction preventing layer 5 can be formed at a treatment temperature of 1100° C. or lower makes it possible to suppress damage to the metal support 1, suppress element interdiffusion between the metal support 1 and the electrode layer 2, and realize an electrochemical element E that has excellent performance and durability, and is thus preferable. For example, the reaction preventing layer 5 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Counter Electrode Layer:

The counter electrode layer 6 can be formed as a thin layer on the electrolyte layer 4 or the reaction preventing layer 5. When it is formed as a thin layer, the thickness can be set to approximately 1 μm to 100 μm, and preferably approximately 5 μm to 50 μm, for example. This thickness makes it possible to ensure sufficient electrode performance while also achieving cost reduction by reducing the amount of expensive counter electrode layer material that is used. A complex oxide such as LSCF or LSM, or a ceria-based oxide, or a mixture thereof can be used as the material of the counter electrode layer 6, for example. In particular, it is preferable that the counter electrode layer 6 includes a perovskite oxide containing two or more elements selected from the group consisting of La, Sr, Sm, Mn, Co, and Fe. The counter electrode layer 6 constituted by the above-mentioned material functions as a cathode.

It should be noted that forming the counter electrode layer 6 using, as appropriate, a method through which the counter electrode layer 6 can be formed at a treatment temperature of 1100° C. or lower makes it possible to suppress damage to the metal support 1, suppress element interdiffusion between the metal support 1 and the electrode layer 2, and realize an electrochemical element E that has excellent performance and durability, and is thus preferable. For example, the counter electrode layer 6 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Solid Oxide Fuel Cell:

By configuring the electrochemical element E as described above, the electrochemical element E can be used as a power generating cell for a solid oxide fuel cell. For example, fuel gas containing hydrogen is supplied from the back surface of the metal support 1 through the penetration spaces 1c to the electrode layer 2, air is supplied to the counter electrode layer 6 serving as a counter electrode of the electrode layer 2, and the operation is performed at a temperature of 500° C. or higher and 900° C. or lower, for example. Accordingly, the oxygen $O_2$ included in air reacts with electrons $e^-$ in the counter electrode layer 6, thus producing oxygen ions $O^{2-}$. The oxygen ions $O^{2-}$ move through the electrolyte layer 4 to the electrode layer 2. In the electrode layer 2, the hydrogen $H_2$ included in the supplied fuel gas reacts with the oxygen ions $O^{2-}$, thus producing water $H_2O$ and electrons $e^-$. With these reactions, electromotive force is generated between the electrode layer 2 and the counter electrode layer 6. In this case, the electrode layer 2 functions as a fuel electrode (anode) of the SOFC, and the counter electrode layer 6 functions as an air electrode (cathode).

Method for Manufacturing Electrochemical Element:

Next, a method for manufacturing the electrochemical element E will be described.

Electrode Layer Forming Step:

In an electrode layer forming step, the electrode layer 2 is formed as a thin film in a region that is broader than the region provided with the penetration spaces 1c, on the front face of the metal support 1. The through holes of the metal support 1 can be provided through laser processing or the like. As described above, the electrode layer 2 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

The following is a specific example of the case where low-temperature calcining is performed as the electrode layer forming step. First, a material paste is produced by mixing powder of the material of the electrode layer 2 and a solvent (dispersion medium), and is applied to the front face of the metal support 1. Then, the electrode layer 2 is obtained through compression molding (electrode layer smoothing step) and calcining at a temperature of 1100° C. or lower (electrode layer calcining step). Examples of compression molding of the electrode layer 2 include CIP (Cold Isostatic Pressing) molding, roll pressing molding, and RIP (Rubber Isostatic Pressing) molding. It is favorable to perform calcining of the electrode layer at a temperature of 800° C. or higher and 1100° C. or lower. The order in which the electrode layer smoothing step and the electrode layer calcining step are performed can be changed.

It should be noted that, when an electrochemical element including an intermediate layer 3 is formed, the electrode layer smoothing step and the electrode layer calcining step may be omitted, and an intermediate layer smoothing step and an intermediate layer calcining step, which will be described later, may include the electrode layer smoothing step and the electrode layer calcining step.

It should be noted that lapping molding, leveling treatment, surface cutting treatment, surface polishing treatment, or the like can also be performed as the electrode layer smoothing step.

Diffusion Suppressing Layer Forming Step:

The metal oxide layer if (diffusion suppressing layer) is formed on the surface of the metal support 1 during the calcining step in the above-described electrode layer forming step. It should be noted that it is preferable that the above-mentioned calcining step includes a calcining step in which the calcining atmosphere satisfies the atmospheric condition that the oxygen partial pressure is low because a high-quality metal oxide layer if (diffusion suppressing layer) that has a high element interdiffusion suppressing effect and has a low resistance value is formed. In a case where a coating method that does not include calcining is performed as the electrode layer forming step, a separate diffusion suppressing layer forming step may also be included. In any case, it is desirable to perform these steps at a temperature of 1100° C. or lower such that damage to the metal support 1 can be suppressed. The metal oxide layer if (diffusion suppressing layer) may be formed on the surface of the metal support 1 during the calcining step in an intermediate layer forming step, which will be described later.

Intermediate Layer Forming Step:

In an intermediate layer forming step, the intermediate layer 3 is formed as a thin layer on the electrode layer 2 so as to cover the electrode layer 2. As described above, the intermediate layer 3 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

The following is a specific example of the case where low-temperature calcining is performed as the intermediate layer forming step.

First, a material paste is produced by mixing powder of the material of the intermediate layer 3 and a solvent (dispersion medium), and is applied to the front face of the metal support 1. Then, the intermediate layer 3 is obtained through compression molding (intermediate layer smoothing step) and calcining at a temperature of 1100° C. or lower (intermediate layer calcining step). Examples of rolling of the intermediate layer 3 include CIP (Cold Isostatic Pressing) molding, roll pressing molding, and RIP (Rubber Isostatic Pressing) molding. It is favorable to perform calcining of the intermediate layer 3 at a temperature of 800° C. or higher and 1100° C. or lower. The reason for this is that this temperature makes it possible to form an intermediate layer 3 that has high strength while suppressing damage to and deterioration of the metal support 1. It is more preferable to perform calcining of the intermediate layer 3 at a temperature of 1050° C. or lower, and more preferably 1000° C. or lower. The reason for this is that the lower the calcining temperature of the intermediate layer 3 is, the more likely it is to further suppress damage to and deterioration of the metal support 1 when forming the electrochemical element E. The order in which the intermediate layer smoothing step and the intermediate layer calcining step are performed can be changed.

It should be noted that lapping molding, leveling treatment, surface cutting treatment, surface polishing treatment, or the like can also be performed as the intermediate layer smoothing step.

Electrolyte Layer Forming Step:

In an electrolyte layer forming step, the electrolyte layer 4 is formed as a thin layer on the intermediate layer 3 so as to cover the electrode layer 2 and the intermediate layer 3. The electrolyte layer 4 may also be formed as a thin film having a thickness of 10 µm or less. As described above, the electrolyte layer 4 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

It is desirable to perform a spray coating technique as the electrolyte layer forming step in order to form a high-quality electrolyte layer 4 that is dense and has high gas-tightness and gas barrier properties in a temperature range of 1100° C. or lower. In this case, the material of the electrolyte layer 4 is sprayed onto the intermediate layer 3 on the metal support 1, and the electrolyte layer 4 is thus formed.

Reaction Preventing Layer Forming Step:

In a reaction preventing layer forming step, the reaction preventing layer 5 is formed as a thin layer on the electrolyte layer 4. As described above, the reaction preventing layer 5 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1. It should be noted that leveling treatment, surface cutting treatment, or surface polishing treatment may be performed after the formation of the reaction preventing layer 5, or pressing processing may be performed after wet formation and before calcining in order to flatten the top face of the reaction preventing layer 5.

Counter Electrode Layer Forming Step:

In a counter electrode layer forming step, the counter electrode layer 6 is formed as a thin layer on the reaction preventing layer 5. As described above, the counter electrode layer 6 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

In this manner, the electrochemical element E can be manufactured.

It should be noted that a configuration is also possible in which the electrochemical element E does not include both or either of the intermediate layer 3 (intervening layer) and the reaction preventing layer 5. That is, a configuration is also possible in which the electrode layer 2 and the electrolyte layer 4 are in contact with each other, or a configuration is also possible in which the electrolyte layer 4 and the counter electrode layer 6 are in contact with each other. In this case, in the above-described manufacturing method, the intermediate layer forming step and the reaction preventing layer forming step are omitted. It should be noted that it is also possible to add a step of forming another layer or to form a plurality of layers of the same type one on top of another, but in any case, it is desirable to perform these steps at a temperature of 1100° C. or lower.

Second Embodiment

An electrochemical element E, an electrochemical module M, an electrochemical device Y, and an energy system Z according to a second embodiment will be described with reference to FIGS. 2 and 3.

Figure 2:
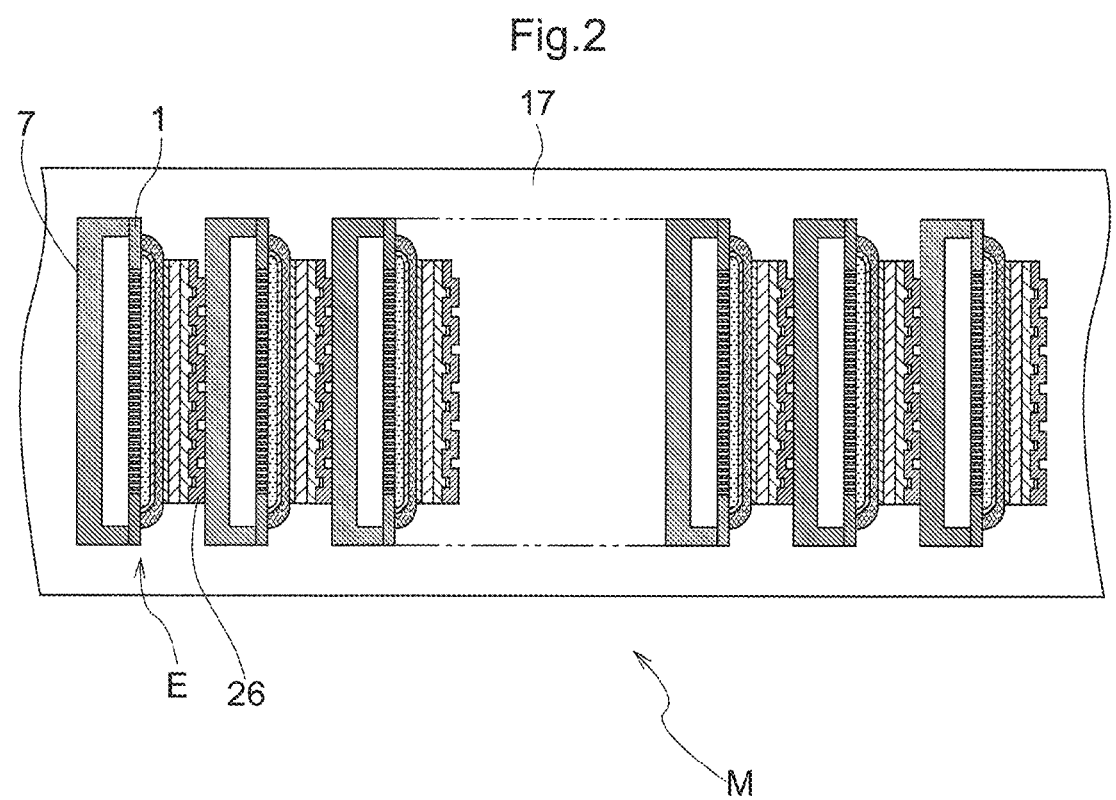
FIG. 2 is a schematic diagram showing configurations of electrochemical elements and an electrochemical module.

As shown in FIG. 2, in the electrochemical element E according to the second embodiment, a U-shaped member 7 is attached to the back face of the metal support 1, and the metal support 1 and the U-shaped member 7 form a tubular support.

The electrochemical module M is configured by stacking (assembling) a plurality of electrochemical elements E with collector members 26 being sandwiched therebetween. Each of the collector members 26 is joined to the counter electrode layer 6 of the electrochemical element E and the U-shaped member 7, and electrically connects them.

The electrochemical module M includes a gas manifold 17, the collector members 26, a terminal member, and a current extracting unit. One open end of each tubular support in the stack of the plurality of electrochemical elements E is connected to the gas manifold 17, and gas is supplied from the gas manifold 17 to the electrochemical elements E. The supplied gas flows inside the tubular supports, and is supplied to the electrode layers 2 through the penetration spaces 1c of the metal supports 1.

FIG. 3 shows an overview of the energy system Z and the electrochemical device Y.

The energy system Z includes the electrochemical device Y, and a heat exchanger 53 serving as a waste heat utilization system that reuses heat discharged from the electrochemical device Y.

The electrochemical device Y includes the electrochemical module M, a desulfurizer 31, and a reformer 34, and includes a fuel supply unit that supplies fuel gas containing a reducing component to the electrochemical module M, and an inverter 38 that extracts power from the electrochemical module M.

Specifically, the electrochemical device Y includes the desulfurizer 31, a water tank 32, a vaporizer 33, the reformer 34, a blower 35, a combustion unit 36, the inverter 38, a control unit 39, a storage container 40, and the electrochemical module M.

The desulfurizer 31 removes sulfur compound components contained in a hydrocarbon-based raw fuel such as city gas (i.e., performs desulfurization). When a sulfur compound is contained in the raw fuel, the inclusion of the desulfurizer 31 makes it possible to suppress the influence that the sulfur compound has on the reformer 34 or the electrochemical elements E. The vaporizer 33 produces water vapor (steam) from water supplied from the water tank 32. The reformer 34 uses the water vapor (steam) produced by the vaporizer 33 to perform steam reforming of the raw fuel desulfurized by the desulfurizer 31, thus producing reformed gas containing hydrogen.

The electrochemical module M generates power by causing an electrochemical reaction to occur with use of the reformed gas supplied from the reformer 34 and air supplied from the blower 35. The combustion unit 36 mixes the reaction exhaust gas discharged from the electrochemical module M with air, and burns combustible components in the reaction exhaust gas.

The electrochemical module M includes a plurality of electrochemical elements E and the gas manifold 17. The electrochemical elements E are arranged side-by-side and electrically connected to each other, and one end portion (lower end portion) of each of the electrochemical elements E is fixed to the gas manifold 17. The electrochemical elements E generate power by causing an electrochemical reaction to occur between the reformed gas supplied via the gas manifold 17 and air supplied from the blower 35.

The inverter 38 adjusts the power output from the electrochemical module M to obtain the same voltage and frequency as electrical power received from a commercial system (not shown). The control unit 39 controls the operation of the electrochemical device Y and the energy system Z.

The vaporizer 33, the reformer 34, the electrochemical module M, and the combustion unit 36 are stored in the storage container 40. The reformer 34 performs reforming process on the raw fuel with use of combustion heat produced by the combustion of reaction exhaust gas in the combustion unit 36.

The raw fuel is supplied to the desulfurizer 31 via a raw fuel supply passage 42, due to the operation of a booster pump 41. The water in the water tank 32 is supplied to the vaporizer 33 via a water supply passage 44, due to the operation of a water pump 43. The raw fuel supply passage 42 merges with the water supply passage 44 at a location on the downstream side of the desulfurizer 31, and the water and the raw fuel, which have been merged outside of the storage container 40, are supplied to the vaporizer 33 provided in the storage container 40.

The water is vaporized by the vaporizer 33 to produce water vapor. The raw fuel, which contains the water vapor produced by the vaporizer 33, is supplied to the reformer 34 via a water vapor-containing raw fuel supply passage 45. In the reformer 34, the raw fuel is subjected to steam reforming, thus producing reformed gas that includes hydrogen gas as a main component (first gas including a reducing component). The reformed gas produced in the reformer 34 is supplied to the gas manifold 17 of the electrochemical module M via a reformed gas supply passage 46.

The reformed gas supplied to the gas manifold 17 is distributed among the electrochemical elements E, and is supplied to the electrochemical elements E from the lower ends, which are the connection portions where the electrochemical elements E and the gas manifold 17 are connected to each other. Mainly the hydrogen (reducing component) in the reformed gas is used in the electrochemical reaction in the electrochemical elements E. The reaction exhaust gas, which contains remaining hydrogen gas not used in the reaction, is discharged from the upper ends of the electrochemical elements E to the combustion unit 36.

The reaction exhaust gas is burned in the combustion unit 36, and combustion exhaust gas is discharged from a combustion exhaust gas outlet 50 to the outside of the storage container 40. A combustion catalyst unit 51 (e.g., a platinum-based catalyst) is provided in the combustion exhaust gas outlet 50, and reducing components such as carbon monoxide and hydrogen contained in the combustion exhaust gas are removed by combustion. The combustion exhaust gas discharged from the combustion exhaust gas outlet 50 is sent to the heat exchanger 53 via a combustion exhaust gas discharge passage 52.

The heat exchanger 53 uses supplied cool water to perform heat exchange on the combustion exhaust gas produced by combustion in the combustion unit 36, thus producing warm water. In other words, the heat exchanger 53 operates as a waste heat utilization system that reuses heat discharged from the electrochemical device Y.

It should be noted that instead of the waste heat utilization system, it is possible to provide a reaction exhaust gas using unit that uses the reaction exhaust gas that is discharged from (not burned in) the electrochemical module M. The reaction exhaust gas contains remaining hydrogen gas that was not used in the reaction in the electrochemical elements E. In the reaction exhaust gas using unit, the remaining hydrogen gas is used to perform heat utilization through combustion or power generation by a fuel cell and so on, thus achieving effective energy utilization.

Third Embodiment

FIG. 4 shows another embodiment of the electrochemical module M. The electrochemical module M according to a third embodiment is configured by stacking the above-described electrochemical elements E with cell connecting members 71 being sandwiched therebetween.

Each of the cell connecting members 71 is a plate-like member that has electrical conductivity and does not have gas permeability, and the front face and the back face are respectively provided with grooves 72 that are orthogonal to each other. The cell connecting members 71 can be formed using a metal such as stainless steel or a metal oxide.

As shown in FIG. 4, when the electrochemical elements E are stacked with the cell connecting members 71 being sandwiched therebetween, a gas can be supplied to the electrochemical elements E through the grooves 72. Specifically, the grooves 72 on one side are first gas passages 72a and supply gas to the front side of one electrochemical element E, that is to say, the counter electrode layer 6. The grooves 72 on the other side are second gas passages 72b and supply gas from the back side of one electrochemical element E, that is, the back face of the metal support 1, through the penetration spaces 1c to the electrode layers 2.

In the case of operating this electrochemical module M as a fuel cell, oxygen is supplied to the first gas passages 72a, and hydrogen is supplied to the second gas passages 72b. Accordingly, a fuel cell reaction progresses in the electrochemical elements E, and electromotive force and electrical current are generated. The generated power is extracted to the outside of the electrochemical module M from the cell connecting members 71 at the two ends of the stack of electrochemical elements E.

It should be noted that although the grooves 72 that are orthogonal to each other are respectively formed on the front face and the back face of each of the cell connecting members 71 in Third Embodiment, grooves 72 that are parallel to each other can be respectively formed on the front face and the back face of each of the cell connecting members 71.

Other Embodiments (1) Although the electrochemical elements E are used in a solid oxide fuel cell in the embodiments described above, the electrochemical elements E can also be used in a solid oxide electrolytic (electrolysis) cell, an oxygen sensor using a solid oxide, and the like.

(2) In the embodiments described above, a composite material such as NiO-GDC, Ni-GDC, NiO—YSZ, Ni—YSZ, CuO—CeO$_2$, or Cu—CeO$_2$ is used as the material of the electrode layer 2, and a complex oxide such as LSCF or LSM is used as the material of the counter electrode layer 6. With this configuration, the electrode layer 2 serves as a fuel electrode (anode) when hydrogen gas is supplied thereto, and the counter electrode layer 6 serves as an air electrode (cathode) when air is supplied thereto, thus making it possible to use the electrochemical element E as a cell for a solid oxide fuel cell. It is also possible to change this configuration and thus configure an electrochemical element E such that the electrode layer 2 can be used as an air electrode and the counter electrode layer 6 can be used as a fuel electrode. That is, a complex oxide such as LSCF or LSM is used as the material of the electrode layer 2, and a composite material such as NiO-GDC, Ni-GDC, NiO—YSZ, Ni—YSZ, CuO—CeO$_2$, or Cu—CeO$_2$ is used as the material of the counter electrode layer 6. With this configuration, the electrode layer 2 serves as an air electrode when air is supplied thereto, and the counter electrode layer 6 serves as a fuel electrode when hydrogen gas is supplied thereto, thus making it possible to use the electrochemical element E as a cell for a solid oxide fuel cell.

(3) Although the electrochemical element E is mainly used in a solid oxide fuel cell having a flat-plate shape or a cylindrical flat-plate shape in the embodiments described above, the electrochemical element E can also be applied to electrochemical elements for a solid oxide fuel cell having a cylindrical shape.

(4) Although the metal support 1 (metal plate) is used as a support for the electrochemical element E in the embodiments described above, the metal plates of these embodiments can also be used as a support for various materials such as a ceramic layer (an example of objects to be supported) and used in various devices other than an electrochemical element.

It should be noted that the configurations disclosed in the above-described embodiments can be used in combination with configurations disclosed in other embodiments as long as they are compatible with each other. The embodiments disclosed in this specification are illustrative, and embodiments of the present invention are not limited thereto and can be modified as appropriate without departing from the object of the present invention.

INDUSTRIAL APPLICABILITY

The present invention can be applied to a metal plate, and a metal-supported electrochemical element and a cell for a solid oxide fuel cell that include the metal plate.

DESCRIPTION OF REFERENCE SIGNS

1: Metal support (metal plate)
1a: Front face
1b: Back face
1c: Penetration space
1d: Front-side opening
1e: Back-side opening
1f: Metal oxide layer
1g: Hole region
1h: Unit region
2: Electrode layer
3: Intermediate layer
4: Electrolyte layer
5: Reaction preventing layer
6: Counter electrode layer
100: Metal plate
110: Thick portion
120: Thin portion
E: Electrochemical element
M: Electrochemical module
Y: Electrochemical device
Z: Energy system

The invention claimed is:

1. A metal plate comprising;
a thick portion; and
a thin portion that is thinner than the thick portion,
wherein the thin portion is provided with a penetration space passing through the thin portion in a thickness direction, and
wherein the metal plate has a metal plate aspect ratio that is a value obtained by dividing an overall thickness of the metal plate by a minimum inner diameter of the penetration space is 2 or more, the overall thickness of the metal plate being a thickness of the thick portion which is a thickness between a front face and a back face of the metal plate.

2. The metal plate according to claim 1, further comprising:
a plurality of the thick portions; and
a plurality of the thin portions.

3. The metal plate according to claim 1, wherein the thin portion is provided with a plurality of the penetration spaces.

4. The metal plate according to claim 1, wherein an overall thickness of the metal plate is 0.1 mm or more and 1 mm or less.

5. The metal plate according to claim 1, wherein the metal plate is constituted by a single plate made of metal.

6. The metal plate according to claim 1, wherein the metal plate is made of a Fe—Cr based alloy.

7. The metal plate according to claim 1, wherein at least a portion of a surface of the metal plate is covered by a metal oxide film.

8. An electrochemical element in which at least an electrode layer, an electrolyte layer, and a counter electrode layer are provided on/over the metal plate according to claim 1.

9. An electrochemical module in which a plurality of the electrochemical elements according to claim 8 are arranged in an assembled state.

10. An electrochemical device comprising at least the electrochemical module according to claim 9 and a reformer, and comprising a fuel supply unit that supplies fuel gas containing a reducing component to the electrochemical module.

11. An energy system comprising the electrochemical device according to claim 10, and waste heat utilization system that reuses heat discharged from the electrochemical device.

12. An electrochemical device comprising at least the electrochemical module according to claim 9 and an inverter that extracts power from the electrochemical module.

13. An energy system comprising the electrochemical device according to claim 12, and waste heat utilization system that reuses heat discharged from the electrochemical device.

14. A solid oxide fuel cell comprising the electrochemical element according to claim 8,
wherein a power generation reaction is caused in the electrochemical element.

15. A method for manufacturing a metal plate, comprising:
a first processing step of forming a thick portion and a thin portion that is thinner than the thick portion in the metal plate; and
a second processing step of providing the thin portion formed in the first processing step with a penetration space passing through the thin portion in a thickness direction, wherein the metal plate has a metal plate aspect ratio that is a value obtained by dividing an overall thickness of the metal plate by a minimum inner diameter of the penetration space is 2 or more, the overall thickness of the metal plate being a thickness of the thick portion which is a thickness between a front face and a back face of the metal plate.

16. The method for manufacturing a metal plate according to claim 15,
wherein pressing processing, etching processing, or laser processing is performed in the first processing step, and pressing processing, etching processing, or laser processing is performed in the second processing step.

* * * * *